Sept. 15, 1964     F. J. BRUGLIERA ETAL     3,149,317

RADIO ALARM

Filed July 13, 1960     2 Sheets-Sheet 1

INVENTORS
Frank J. Brugliera
BY   Louis E. Pepperberg

Mueller and Aichele
Attys.

Sept. 15, 1964  F. J. BRUGLIERA ETAL  3,149,317
RADIO ALARM
Filed July 13, 1960  2 Sheets-Sheet 2
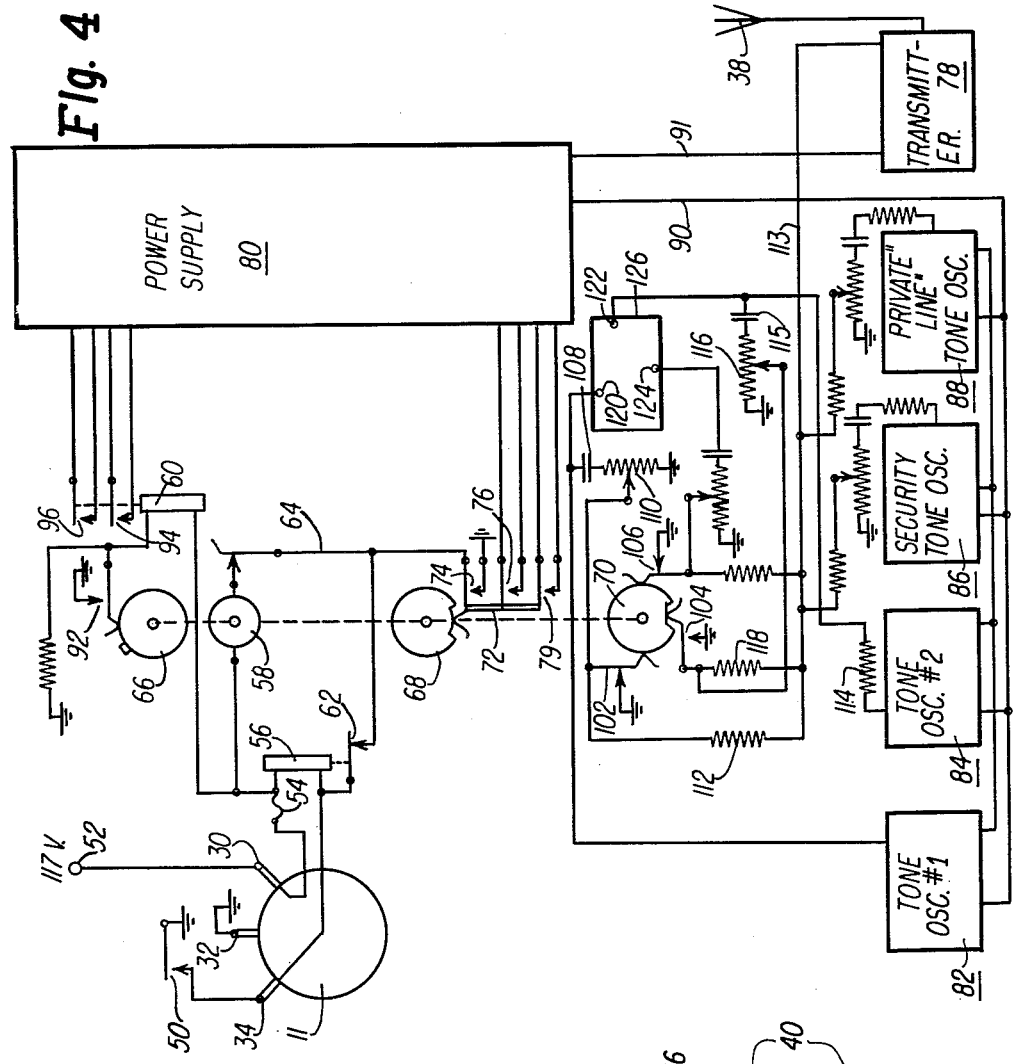
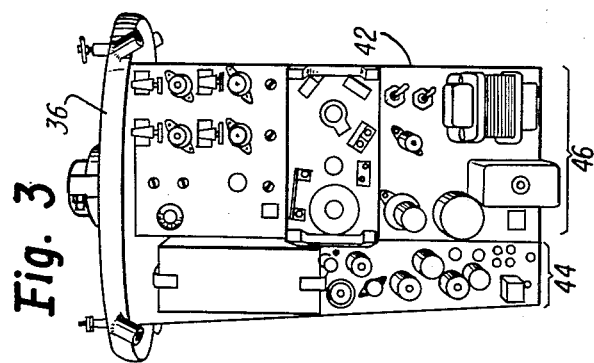
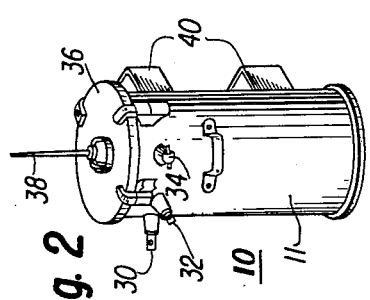
INVENTORS
Frank J. Brugliera
Louis E. Pepperberg
BY Mueller and Aichele
Attys.

United States Patent Office 3,149,317
Patented Sept. 15, 1964

3,149,317
RADIO ALARM
Frank J. Brugliera, Niles, and Louis E. Pepperberg, Highland Park, Ill., assignors to Motorola, Inc., Chicago, Ill., a corporation of Illinois
Filed July 13, 1960, Ser. No. 42,535
5 Claims. (Cl. 340—224)

This invention relates generally to radio alarm signaling systems and in particular to an alarm system to be utilized with electric power distribution lines.

Electric power systems normally provide protection from overloads and fault currents and such protection may be obtained through use of various devices such as circuit breakers including the types known as reclosers and sectionalizers. When a failure occurs in an electric system, the location of such failure must be determined rapidly and accurately so that the cause of the outage may be corrected. In a highly populated metropolitan area, the electric utility serving such area is usually notified when a failure occurs, as by telephone, by customers whose electric service has been disrupted. The telephone calls received from these customers may make it possible for the electric utility to set geographical limits of the area involved in the electric power outage and maintenance crews may be dispatched to the area. Location of outages in rural areas is particularly difficult where communication facilities such as telephones are not readily available. Also, it is desirable to have information as to failures immediately and directly without waiting for customer complaints.

In transmission line systems where voltages are of a magnitude of 69 kv. or more, circuit breakers having high current capabilities are used and the location of an operated circuit breaker usually may be ascertained at a central load dispatching station which is linked by wire or radio to the circuit breakers located at substations in the electric system. However, in distribution line systems where line voltages are below 69 kv., the exact location of a fault or overload condition is difficult to ascertain because the protective circuit interrupting devices are not linked to a central load station. Once the exact location of a fault or overload condition is known, maintenance crews may be dispatched to repair the electric system as quickly as possible, thereby minimizing the revenue loss to the electric utility and possibly great loss and inconvenience to the users of electric power. Although fault or overload indicators which utilize radio transmitters and receivers have been used, they have been expensive to purchase, install and maintain, have not given optimum performance, and have been cumbersome in size. The fault indicators known to the present time, have been subject to false operation and sometimes when the signal-to-noise ratio of the received signal is high the operation of the fault indicators has been spasmodic.

Thus, it is an object of the present invention to provide a radio alarm system for electric distribution power lines which will accurately and reliably locate an overload or other unusual condition on such power lines.

Another object of the present invention is to provide a radio alarm system having a transmitter carrier modulated by a plurality of tone frequencies for indicating the operation of remote units in an electric distribution system.

A feature of the invention is the provision of a radio alarm system for electric power lines, such system having a radio transmitter which transmits a predetermined pulse modulated radio signal upon actuation of related protective apparatus, such as a recloser, when a fault or overload condition occurs on such electric power lines.

Another feature of the invention is the provision of a radio alarm system for electric power lines, such system including a transmitter which utilizes a motor actuated camshaft having snap switch contacts which cause modulation of a carrier wave for a predetermined period of time when a failure occurs on such power lines.

Still another feature of the invention is the provision of a radio alarm system for electric power lines, such system including a sending unit which has a delay circuit to provide a warm-up period for the tone oscillators and transmitter before a carrier wave is modulated.

FIG. 2 is a perspective view of the housing of a remote sender unit including a radio transmitter utilized in the invention;

FIG. 3 is a perspective view of the transmitter component of the sender unit utilized in the invention; and FIG. 4 is a schematic and block diagram of the transmitter used in the radio alarm system of the invention.

In practicing the invention, a remote radio alarm system is provided for use on electric power distribution systems. The alarm system includes a transmitter for providing a tone modulated carrier wave and is energized in response to actuation of standard protective equipment such as a recloser type circuit breaker used on electric power systems. The transmitter units are housed in standard metal transformer housings and are located at strategic points on the electric distribution lines. The transmitters operate on an assigned frequency modulation channel, and each transmitter may be located on a pole adjacent the pole on which the circuit interrupting device is located. A switch is connected to the circuit breaker and such switch actuates the transmitter unit coupled thereto. Each transmitter includes a timer device which applies an identifying tone code to frequency modulate the carrier wave, and the tone coded radio signal is received by a central network receiver. The tones or audio components of the received signal are then decoded and may activate a visual or aural indicator signalling device and/or a printer which prints the identification code number of the actuated transmitter. After the transmission period, the transmitter unit is deenergized by circuitry which prevents continuous transmission while the energizing switch is closed. When the identification number of the transmitter is received, maintenance crews may be dispatched to the area where the outage has occurred.

Figure 1:
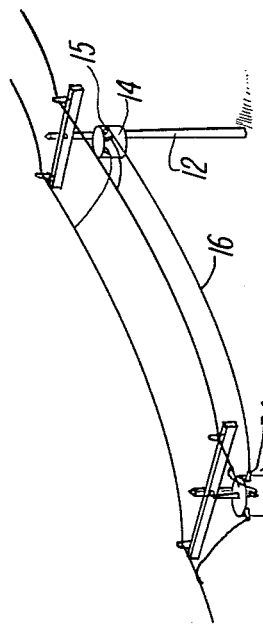
FIG. 1 illustrates in perspective and block diagram form a typical radio alarm system wherein the invention is utilized.
Figure 1:
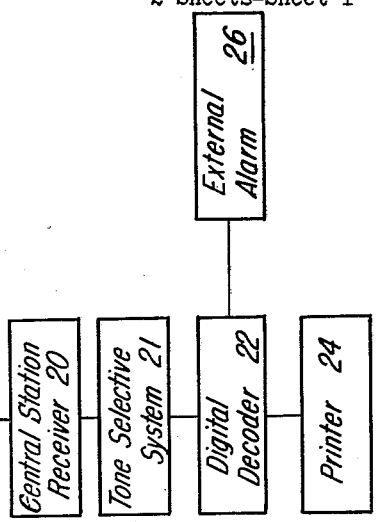
Figure 1:
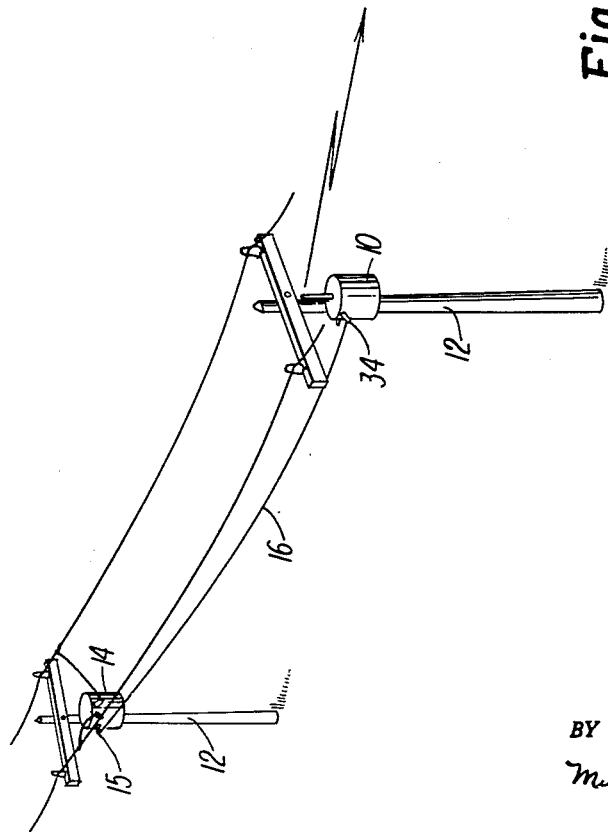

Referring now to the drawings, FIG. 1 illustrates a typical radio alarm system for electric power lines on which the invention is utilized. A plurality of remote alarm transmitters 10, which transmit on an assigned frequency modulation channel, may be mounted on utility poles 12 at strategic points along the electric power distribution system, one span away from circuit breakers such as reclosers 14 also mounted on poles 12. In the event of an overload or fault, a switch in recloser 14 provides a ground at terminal 15, which is connected through lead 16 to terminal 34 on transmitter 10. The transmitter 10 is then energized after which tone pulses forming a code are frequency modulated on a carrier wave and transmitted. Central station receiver 20 receives the radio signal through antenna 18 and a tone selective system 21 responds to various tones to actuate decoder 22 which may in turn activate an external signaling device 26. The decoded signals may also be used to actuate printer 24 which prints the identification code number of the actuated transmitter on a paper tape. The identification number indicates which circuit breaker in the electric system has operated and maintenance crews may be dispatched to the area. After the trouble which caused the outage has been corrected, recloser 14 and the ground switch thereon are reset so that they may operate again if another electric outage occurs.

FIG. 2 illustrates a transmitter 10 and shows the housing wherein the radio transmitter is located. Housing 11 may be similar to a standard 3 kva. distribution transformer tank and has terminals 30, 32 and 34 extending from the side and a cover 36 with an antenna 38 projecting from the cover. Mounting brackets 40 are used to mount the housing on a pole as shown in FIG. 1, in a manner used to mount distribution transformers. The equipment may be sealed in the tanks in an atmosphere of dry air or a dry inert gas to prevent moisture and ice from collecting on the equipment to reduce its reliability.

FIG. 3 shows the complete transmitter chassis 42 attached to cover 36 for easy removal from the housing. The transmitter component 44 is mounted on the left portion of chassis 42 and the timer, power supply, and tone oscillators are mounted on the right portion 46 of chassis 42.

FIG. 4 is a schematic diagram of the transmitter 42 which is normally located in transmitter housing 11. The ground switch which may be coupled to a recloser is represented by a switch 50, and as previously stated this is connected to terminal 34 on housing 11. A source of 117 volts A.C. is connected to terminal 30 and through fuse 54 to the coil of relay 56. This source must be derived from the side of the recloser that remains hot when the recloser is open, so that power is applied when the recloser is open. Actuator switch 50 is connected through terminal 34 to the other side of the coil of relay 56 and provides a ground return path therefor. The timing motor 58 is also energized through switch 50 and through normally closed contacts 62 of relay 56. Relay 56 provides a 30 second delay and then operates to open normally closed contacts 62. During this 30 second delay period a ground return path is provided through contacts 62 and lead 64 to timing motor 58. Timing motor 58 is now energized and through mechanical linkage rotates transmit cam 66 which has a 1 minute cycle, the motor switch cam 68 which has a 5 minute cycle, and tone code cam 70 which has a 3 second cycle.

Motor switch cam 68 closes all contacts of the motor snap-switch 72. Contacts 74 of switch 72 apply a ground to line 64 to provide a return path to timing motor 58 so that it will continue to operate for a five minute cycle even through contacts 62 of delay relay 56 open. Delay relay 56 must not operate until the switch 72 closes. Contacts 76 of switch 72 complete a circuit in power supply 80 to apply filament voltage to all tube filaments in transmitter 78. Contacts 79 of switch 72 complete a circuit in power supply 80 to apply potential to tone oscillators 82, 84, 86 and 88 through lead 90 to activate these oscillators.

Transmit cam 66 (1 minute cycle) closes transmit switch 92 for three seconds during each one minute cycle, thereby completing the ground return circuit of transmit relay 60. Contacts 94 of relay 60 complete a circuit in power supply 80 for supplying B+ voltage to transmitter 78. Contacts 96 connect circuits in power supply 80 to develop 425 volts as required for the B++ voltage for transmitter 78. The B+ and B++ voltages are applied through cable 91.

Tone code cam 70 (3 second cycle) completes one revolution every three seconds and this opens and closes digit tone switches 102, 104 and 106 in sequence beginning with 102. The output from tone oscillator 82 is fed through coupling capacitor 108 to the first digit tone level control resistor 110. When switch 102 opens ungrounding the movable arm of variable control resistor 110, the tone signal from oscillator 82 is fed through resistor 112 and lead 113 to the modulator stage in transmitter 78. When the second digit tone switch 104 opens, the output from tone oscillator 84 is connected through resistor 114 and coupling capacitor 115 to control resistor 116. Removal of the ground of the movable arm of resistor 116 allows the tone signal to pass through resistor 118 to lead 113 and to transmitter 78.

When the third digit tone switch 106 opens, the tone signal from either tone oscillator 82 or tone oscillator 84, or possibly neither, is coupled to the modulator in transmitter 78 for the third digit tone pulse. The terminals 120, 122 and 124 on terminal board 126 may be jumpered to select a tone from either oscillator 82 or 84 for the third tone pulse or if no jumper is used, no third digit tone pulse will be applied. It will be apparent that a number of tones other than three can be used if desired. More tones can be used by providing more switches about the cam 70 with the notch in the cam being reduced to apply each tone for a shorter period.

The outputs of tone oscillator 86 and tone oscillator 88 are applied to lead 113 and to transmitter 78 for the full three second transmit period. Tone oscillator 86 provides a security tone and tone oscillator 88 provides a dual squelch tone. The tone from oscillator 88 provides a tone signal for selective squelch operation similar to that disclosed in Peth Patent No. 2,918,571, issued December 22, 1959.

All of the tone oscillators 82, 84, 86 and 88 may be identical and are designed to supply stable audio signals for use in the remote alarm center unit. These tones are applied during the three second interval of each minute during which the transmitter is energized through action of cam 66. Five such transmissions are provided during the five minute operation provided by cam 68.

When the motor switch cam 68 completes its five minute cycle, motor snap switch 72 is released thereby opening contacts 74 which provide a ground return path for timing motor 58. Thus, timing motor 58 is deenergized and tone transmission ceases because contacts 76 and 79 are opened which control energization of the tone oscillator and application of filament potential through the power supply 80. Contacts 62 of delay relay 56 remain open so that the timing motor 58 will not re-cycle after an alarm signal has been transmitted during the five minute cycle.

Thus, the invention provides a radio alarm system for use in indicating electric power failures on an electric distribution network. The alarm system provides reliable, accurate monitoring through the use of a transmitter which transmits a pulsed code signal representing an identification code number whenever a related circuit interrupting device, such as a recloser, operates. The transmitting cycle for each transmitter is only three seconds out of each minute and allows signals from more than one transmitter to be received if a major power failure occurs which might cause many circuit breakers to operate, thereby actuating many transmitter units.

Although the alarm system is illustrated for use with a recloser, it is to be pointed out that this can be used to provide an alarm for any purpose. For example, it can be used to give an alarm upon failure of water, gas, or other utilities.

We claim:

1. In a radio alarm system for indicating operation of units each operating a switch in response to an alarm condition, a transmitter unit associated with each switch and including in combination, a housing, electronic equipment within said housing including, a timer, means for coupling said timer to the switch for actuation of said timer thereby, a plurality of tone oscillators providing tones of different frequencies, first, second and third switch means operated by said timer, and a transmitter modulator means, said first switch means applying energizing potential to said tone oscillators for a first period, said second switch means applying energizing potential to said modulator means for a plurality of spaced periods within said first period, and said third switch means selectively applying tones from said tone oscillators to said modulator means, whereby a pulsed tone signal is repeatedly transmitted for a predetermined time duration.

2. A radio alarm system for indicating failures in an electric distribution network having a plurality of circuit breakers each operating a switch in response to an alarm condition, said radio alarm system including a plurality of transmitter units each including a delay switch, a timer actuated through the circuit breaker switch and said delay switch and having contacts holding the same operated for a five minute period, a plurality of tone oscillators providing signals of different frequencies, first, second and third switch means coupled to said timer and operated thereby, and modulator means, said first switch means applying energizing potential to said tone oscillators for a five minute period, said second switch means applying energizing potential to said modulator means for a three second time period during each minute of operation, and said third switch means selectively applying tones from said tone oscillators to said modulator means during said three second period of each minute of operation whereby a pulsed tone signal is transmitted for three seconds during each minute of the five minute transmission period, said delay switch opening after a period less than five minutes to prevent energization of said timer through the circuit breaker switch at the completion of one five minute period of operation.

3. A radio alarm system for indicating actuation of units each operating a unit switch in response to an alarm condition, said radio alarm system including a plurality of transmitter units each including a delay switch, a timer having contacts for holding the same operated for a predetermined period, circuit means coupled to the unit switch and to said timer through said delay switch for energizing said timer, a plurality of tone oscillators providing signals of different frequencies, first, second and third switch means coupled to said timer and operated thereby, and modulator means, said first switch means applying energizing potential to said tone oscillators for the predetermined period, said second switch means applying energizing potential to said modulator means for a portion of a shorter period which occurs a plurality of times during the predetermined period, said third switch means selectively applying tones from said tone oscillators to said modulator means during said portion of said shorter period whereby a pulsed tone signal is transmitted during a portion of each of said shorter periods, said delay switch opening after a period less than the predetermined period to prevent reenergization of said timer through said circuit coupled to the switch on the unit after said contacts of said timer release the same at the termination of said predetermined period.

4. In a radio alarm system for indicating operation of units each operating a switch in response to an alarm condition, a transmitter unit associated with each switch and including in combination a sealed housing of the transformer type, a dry gas filling said housing, electronic equipment within said housing including, a timer, means for coupling said timer to the switch for actuation of said timer thereby, a plurality of tone oscillators providing tones of different frequencies, first, second and third switch means operated by said timer, and a transmitter modulator means, said first switch means applying energizing potential to said tone oscillators for a first period, said second switch means applying energizing potential to said modulator means for a plurality of spaced periods within said first period, and said third switch means selectively applying tones from said tone oscillators to said modulator means, whereby a pulsed tone signal is repeatedly transmitted for a predetermined time duration.

5. In a radio alarm system for indicating operation of units each operating a switch in response to an alarm condition, a transmitter unit associated with each switch and including in combination, a housing, electronic equipment within said housing including, a timer operative through a timing cycle having a predetermined time duration upon energization thereof, time delay relay means connected to the switch for energization thereby and having contacts connecting said timer to the switch for energization of said timer, tone oscillator means providing tones of different frequencies, and transmitter modulator means, said timer including switch means operating during each timing cycle for applying energizing potential to said tone oscillator means and to said modulator means and selectively applying tones from said tone oscillator means to said modulator means, whereby a pulsed tone signal is transmitted for the predetermined time duration, said time delay relay means operating automatically to open said contacts thereof at a time interval after energization thereof less than the predetermined time duration to open the connection from the switch to said timer and prevent actuation of said timer through a second timing cycle, said time delay relay means being de-energized when the switch is released and causing said contacts thereof to close automatically.

References Cited in the file of this patent
UNITED STATES PATENTS

| | | |
|---|---|---|
| 1,497,194 | Norden et al. | June 10, 1924 |
| 2,134,562 | Kimmich | Oct. 25, 1938 |
| 2,173,560 | Nekolny | Sept. 19, 1939 |
| 2,503,371 | Bachelet | Apr. 11, 1950 |
| 2,602,162 | Kenyon | July 1, 1952 |
| 2,700,152 | Jones et al. | Jan. 18, 1955 |
| 2,853,540 | Camilli et al. | Sept. 23, 1958 |
| 3,040,308 | Hubby | June 19, 1962 |